United States Patent
Bussell et al.

(10) Patent No.: US 10,984,369 B2
(45) Date of Patent: Apr. 20, 2021

(54) SYSTEM AND METHOD FOR HANDLING PAYMENT ERRORS WITH RESPECT TO DELIVERY SERVICES

(71) Applicant: Stamps.com Inc., El Segundo, CA (US)

(72) Inventors: Keith D. Bussell, Los Angeles, CA (US); Geoffrey C. Begen, Lake Forest, CA (US)

(73) Assignee: Stamps.com Inc., El Segundo, CA (US)

( * ) Notice: Subject to any disclaimer, the term of this patent is extended or adjusted under 35 U.S.C. 154(b) by 700 days.

(21) Appl. No.: 14/073,478

(22) Filed: Nov. 6, 2013

(65) Prior Publication Data
US 2014/0067664 A1 Mar. 6, 2014

Related U.S. Application Data

(63) Continuation of application No. 11/616,546, filed on Dec. 27, 2006, now Pat. No. 8,612,361.

(51) Int. Cl.
*G06Q 10/08* (2012.01)
*G07B 17/00* (2006.01)
*G06Q 20/40* (2012.01)

(52) U.S. Cl.
CPC ......... *G06Q 10/083* (2013.01); *G06Q 20/405* (2013.01); *G07B 17/00435* (2013.01); *G07B 2017/00443* (2013.01)

(58) Field of Classification Search
CPC .............. G06Q 10/083; G06Q 20/405; G07B 17/00435; G07B 2017/00443
See application file for complete search history.

(56) References Cited

U.S. PATENT DOCUMENTS

| 2,964,232 A | 12/1960 | Levyn |
| 3,221,980 A | 12/1965 | Mercur |

(Continued)

FOREIGN PATENT DOCUMENTS

| DE | 2912696 A1 | 10/1979 |
| DE | 3903718 A1 | 8/1989 |

(Continued)

OTHER PUBLICATIONS

Avery, Susan, "With new postage meters buyers can stamp out costs," Purchasing, 132, 11, Jul. 17, 2003, p. 98-99.*

(Continued)

*Primary Examiner* — Nathan Erb
(74) *Attorney, Agent, or Firm* — Norton Rose Fulbright US LLP

(57) ABSTRACT

Systems and methods which provide processing of payment errors with respect to delivery services in accordance with user preferences. According to embodiments, a delivery service user provides information with respect to how payment errors with respect to delivery services provided to the user are to be handled to facilitate electronic and/or automated processing of such payment errors. A user may authorize payment shortages on the user's behalf, may request notification for an ad hoc determination as to how the shortage is to be handled, or may elect to have postal items returned in the case of payment shortage. Various levels of payment error handling services may be provided with respect to users. Detailed information, such as statistics with respect to users' payment errors, the numbers and types of payment errors, user's preferences in handling payment errors, etcetera, may be provided.

17 Claims, 2 Drawing Sheets

(56) References Cited

U.S. PATENT DOCUMENTS

| | | | |
|---|---|---|---|
| 3,584,696 A | 6/1971 | Eblowitz |
| 3,594,727 A | 7/1971 | Braun |
| 3,691,726 A | 9/1972 | Stephens et al. |
| 3,978,457 A | 8/1976 | Check, Jr. et al. |
| 4,119,194 A | 10/1978 | Freeman et al. |
| 4,253,158 A | 2/1981 | McFiggans |
| 4,271,481 A | 6/1981 | Check, Jr. et al. |
| 4,306,299 A | 12/1981 | Check, Jr. et al. |
| 4,307,293 A | 12/1981 | Lazzarotti et al. |
| 4,310,720 A | 1/1982 | Check, Jr. |
| 4,376,299 A | 3/1983 | Rivest |
| 4,511,793 A | 4/1985 | Racanelli |
| 4,629,871 A | 12/1986 | Scribner et al. |
| 4,641,347 A | 2/1987 | Clark et al. |
| 4,649,266 A | 3/1987 | Eckert |
| 4,661,001 A | 4/1987 | Takai et al. |
| 4,725,718 A | 2/1988 | Sansone et al. |
| 4,743,747 A | 5/1988 | Fougere et al. |
| 4,744,554 A | 5/1988 | Kulpa et al. |
| 4,757,537 A | 7/1988 | Edelmann et al. |
| 4,760,532 A | 7/1988 | Sansone et al. |
| 4,763,271 A | 8/1988 | Field |
| 4,775,246 A | 10/1988 | Edelmann et al. |
| 4,796,181 A | 1/1989 | Wiedemer |
| 4,799,156 A | 1/1989 | Shavit et al. |
| 4,800,506 A | 1/1989 | Axelrod et al. |
| 4,802,218 A | 1/1989 | Wright et al. |
| 4,809,185 A | 2/1989 | Talmadge |
| 4,812,994 A | 3/1989 | Taylor et al. |
| 4,821,195 A | 4/1989 | Baer et al. |
| 4,831,554 A | 5/1989 | Storace et al. |
| 4,831,555 A | 5/1989 | Sansone et al. |
| 4,837,701 A | 6/1989 | Sansone et al. |
| 4,853,865 A | 8/1989 | Sansone et al. |
| 4,858,138 A | 8/1989 | Talmadge |
| 4,862,386 A | 8/1989 | Axelrod et al. |
| 4,864,618 A | 9/1989 | Wright et al. |
| 4,868,757 A | 9/1989 | Gil |
| 4,873,645 A | 10/1989 | Hunter et al. |
| 4,893,249 A | 1/1990 | Silverberg |
| 4,900,903 A | 2/1990 | Wright et al. |
| 4,900,904 A | 2/1990 | Wright et al. |
| 4,900,941 A | 2/1990 | Barton et al. |
| 4,901,241 A | 2/1990 | Schneck |
| 4,908,770 A | 3/1990 | Breault et al. |
| 4,910,686 A | 3/1990 | Chang et al. |
| 4,933,849 A | 6/1990 | Connell et al. |
| 4,934,846 A | 6/1990 | Gilham |
| 4,941,091 A | 7/1990 | Breault et al. |
| 4,947,333 A | 8/1990 | Sansone et al. |
| 4,949,381 A | 8/1990 | Pastor |
| 4,992,940 A | 2/1991 | Dworkin |
| 4,998,204 A | 3/1991 | Sansone et al. |
| 5,025,141 A | 6/1991 | Bolan |
| 5,047,928 A | 9/1991 | Wiedemer |
| 5,058,008 A | 10/1991 | Schumacher |
| 5,065,000 A | 11/1991 | Pusic |
| 5,067,088 A | 11/1991 | Schneiderhan |
| 5,075,862 A | 12/1991 | Doeberl et al. |
| 5,077,792 A | 12/1991 | Herring |
| 5,085,470 A | 2/1992 | Peach et al. |
| 5,091,771 A | 2/1992 | Bolan et al. |
| 5,111,030 A | 5/1992 | Brasington et al. |
| 5,119,306 A | 6/1992 | Metelits et al. |
| 5,136,647 A | 8/1992 | Haber et al. |
| 5,150,407 A | 9/1992 | Chan |
| 5,200,903 A | 4/1993 | Gilham et al. |
| 5,202,834 A | 4/1993 | Gilham et al. |
| 5,233,657 A | 8/1993 | Gunther et al. |
| 5,237,506 A | 8/1993 | Horbal et al. |
| 5,239,168 A | 8/1993 | Durst, Jr. et al. |
| 5,289,540 A | 2/1994 | Jones |
| 5,319,562 A | 6/1994 | Whitehouse |
| 5,323,323 A | 6/1994 | Gilham et al. |
| 5,323,465 A | 6/1994 | Avarne |
| 5,341,505 A | 8/1994 | Whitehouse |
| 5,388,049 A | 2/1995 | Sansone et al. |
| 5,410,642 A | 4/1995 | Hakamatsuka et al. |
| 5,423,573 A | 6/1995 | de Passille |
| 5,425,586 A | 6/1995 | Berson |
| 5,437,441 A | 8/1995 | Tuhro et al. |
| 5,454,038 A | 9/1995 | Cordery et al. |
| 5,471,925 A | 12/1995 | Heinrich et al. |
| 5,476,420 A | 12/1995 | Manning |
| 5,490,077 A | 2/1996 | Freytag |
| 5,510,992 A | 4/1996 | Kara |
| 5,524,995 A | 6/1996 | Brookner et al. |
| 5,573,277 A | 11/1996 | Petkovsek |
| 5,583,779 A | 12/1996 | Naclerio et al. |
| 5,600,562 A | 2/1997 | Guenther |
| 5,602,742 A | 2/1997 | Solondz et al. |
| 5,602,743 A | 2/1997 | Freytag |
| 5,606,507 A | 2/1997 | Kara |
| 5,606,613 A | 2/1997 | Lee et al. |
| 5,612,541 A | 3/1997 | Hoffmann et al. |
| 5,612,889 A | 3/1997 | Pintsov et al. |
| 5,615,123 A | 3/1997 | Davidson et al. |
| 5,617,519 A | 4/1997 | Herbert |
| 5,619,571 A | 4/1997 | Sandstrom et al. |
| 5,623,546 A | 4/1997 | Hardy et al. |
| D380,007 S | 6/1997 | Kara |
| 5,649,118 A | 7/1997 | Carlisle et al. |
| 5,650,934 A | 7/1997 | Manduley |
| 5,655,023 A | 8/1997 | Cordery et al. |
| 5,666,284 A | 9/1997 | Kara |
| 5,682,318 A | 10/1997 | Kara |
| 5,696,829 A | 12/1997 | Cordery et al. |
| 5,706,502 A | 1/1998 | Foley et al. |
| 5,708,422 A | 1/1998 | Blonder et al. |
| 5,715,314 A | 2/1998 | Payne et al. |
| 5,717,596 A | 2/1998 | Bernard et al. |
| 5,717,597 A | 2/1998 | Kara |
| 5,729,460 A | 3/1998 | Plett et al. |
| 5,742,683 A | 4/1998 | Lee et al. |
| 5,758,327 A | 5/1998 | Gardner et al. |
| 5,758,328 A | 5/1998 | Giovannoli |
| D395,333 S | 6/1998 | Kara |
| 5,768,132 A | 6/1998 | Cordery et al. |
| 5,774,886 A | 6/1998 | Kara |
| 5,778,076 A | 7/1998 | Kara et al. |
| 5,781,438 A | 7/1998 | Lee et al. |
| 5,796,834 A | 8/1998 | Whitney et al. |
| 5,801,364 A | 9/1998 | Kara et al. |
| 5,801,944 A | 9/1998 | Kara |
| 5,812,991 A | 9/1998 | Kara |
| 5,819,240 A | 10/1998 | Kara |
| 5,822,739 A | 10/1998 | Kara |
| 5,825,893 A | 10/1998 | Kara |
| 5,842,178 A | 11/1998 | Giovannoli |
| 5,860,068 A | 1/1999 | Cook |
| 5,884,277 A | 3/1999 | Khosla |
| 5,902,439 A | 5/1999 | Pike et al. |
| 5,923,406 A | 7/1999 | Brasington et al. |
| 5,923,885 A | 7/1999 | Johnson et al. |
| 5,929,415 A | 7/1999 | Berson |
| 5,936,885 A | 8/1999 | Morita et al. |
| 5,946,671 A | 8/1999 | Herring et al. |
| 5,960,418 A | 9/1999 | Kelly et al. |
| 5,983,209 A | 11/1999 | Kara |
| 5,987,441 A | 11/1999 | Lee et al. |
| 6,005,945 A | 12/1999 | Whitehouse |
| 6,010,069 A | 1/2000 | Debois |
| 6,010,156 A | 1/2000 | Block |
| 6,026,385 A | 2/2000 | Harvey et al. |
| 6,050,486 A | 4/2000 | French et al. |
| 6,061,670 A | 5/2000 | Brand |
| 6,199,055 B1 | 3/2001 | Kara et al. |
| 6,208,980 B1 | 3/2001 | Kara |
| 6,233,565 B1 | 5/2001 | Lewis et al. |
| 6,249,777 B1 | 6/2001 | Kara et al. |
| 6,256,616 B1 | 7/2001 | Brookner |
| 6,327,042 B1 | 12/2001 | Krasuski et al. |
| 6,349,292 B1 | 2/2002 | Sutherland et al. |
| 6,385,504 B1 | 5/2002 | Pintsov et al. |

(56) References Cited

U.S. PATENT DOCUMENTS

| | | | |
|---|---|---|---|
| 6,385,731 B2 | 5/2002 | Ananda | |
| 6,424,954 B1 | 7/2002 | Leon | |
| 6,430,543 B1 | 8/2002 | Lee et al. | |
| 6,532,452 B1 | 3/2003 | Pintsov et al. | |
| 6,609,117 B2 | 8/2003 | Sutherland et al. | |
| 6,834,273 B1 | 12/2004 | Sansone et al. | |
| 6,853,990 B1 | 2/2005 | Thiel | |
| 6,945,458 B1* | 9/2005 | Shah | G06Q 50/32 235/383 |
| 7,149,726 B1 | 12/2006 | Lingle et al. | |
| 7,182,259 B2 | 2/2007 | Lubow et al. | |
| 7,225,170 B1 | 5/2007 | Ryan, Jr. | |
| 7,226,494 B1 | 6/2007 | Schwartz et al. | |
| 7,266,531 B2 | 9/2007 | Pintsov et al. | |
| 7,337,152 B1 | 2/2008 | Gawler | |
| 7,343,357 B1 | 3/2008 | Kara | |
| 7,458,612 B1 | 12/2008 | Bennett | |
| 7,509,291 B2 | 3/2009 | McBride et al. | |
| 7,548,612 B2 | 6/2009 | Weissman et al. | |
| 7,711,650 B1 | 5/2010 | Kara | |
| 7,778,924 B1 | 8/2010 | Ananda | |
| 7,784,090 B2 | 8/2010 | Lord et al. | |
| 7,831,518 B2 | 11/2010 | Montgomery et al. | |
| 7,831,524 B2 | 11/2010 | Whitehouse | |
| 7,831,824 B2 | 11/2010 | Abdulhayoglu | |
| 7,840,492 B2 | 11/2010 | Leung et al. | |
| 7,954,709 B1 | 6/2011 | Leon et al. | |
| 7,963,437 B1 | 6/2011 | McBride et al. | |
| 8,100,324 B1 | 1/2012 | Leon | |
| 8,155,976 B1 | 4/2012 | Rendich et al. | |
| 8,204,835 B1 | 6/2012 | Ogg | |
| 8,240,579 B1 | 8/2012 | Bennett | |
| 8,612,361 B1 | 12/2013 | Bussell et al. | |
| 8,626,673 B1 | 1/2014 | Bennett | |
| 8,775,331 B1 | 7/2014 | Tsuie et al. | |
| 9,208,620 B1 | 12/2015 | Bortnak et al. | |
| 2001/0007086 A1 | 7/2001 | Rogers et al. | |
| 2001/0020234 A1 | 9/2001 | Shah et al. | |
| 2001/0022060 A1 | 9/2001 | Robertson et al. | |
| 2002/0032668 A1 | 3/2002 | Kohler et al. | |
| 2002/0032784 A1 | 3/2002 | Darago et al. | |
| 2002/0052841 A1 | 5/2002 | Guthrie et al. | |
| 2002/0073050 A1 | 6/2002 | Gusler et al. | |
| 2002/0082935 A1 | 6/2002 | Moore et al. | |
| 2002/0099652 A1 | 7/2002 | Herzen et al. | |
| 2002/0143431 A1 | 10/2002 | Sansone | |
| 2002/0149196 A1 | 10/2002 | Fabel | |
| 2002/0198798 A1* | 12/2002 | Ludwig | G06Q 10/06 705/35 |
| 2003/0029914 A1 | 2/2003 | Hortman et al. | |
| 2003/0037008 A1 | 2/2003 | Raju et al. | |
| 2003/0080182 A1 | 5/2003 | Gunther | |
| 2003/0101143 A1 | 5/2003 | Montgomery et al. | |
| 2003/0101148 A1 | 5/2003 | Montgomery et al. | |
| 2003/0115162 A1 | 6/2003 | Konick | |
| 2003/0138345 A1 | 7/2003 | Schwabe | |
| 2003/0167241 A1 | 9/2003 | Gilham | |
| 2003/0182155 A1 | 9/2003 | Nitzan et al. | |
| 2003/0187666 A1 | 10/2003 | Leon | |
| 2003/0204477 A1 | 10/2003 | McNett | |
| 2003/0233276 A1 | 12/2003 | Pearlman et al. | |
| 2003/0236709 A1 | 12/2003 | Hendra et al. | |
| 2004/0002926 A1 | 1/2004 | Coffy et al. | |
| 2004/0048503 A1 | 3/2004 | Mills et al. | |
| 2004/0064422 A1 | 4/2004 | Leon | |
| 2004/0083189 A1* | 4/2004 | Leon | G07B 17/00024 705/401 |
| 2004/0089482 A1 | 5/2004 | Ramsden et al. | |
| 2004/0093312 A1* | 5/2004 | Cordery | G07B 17/00024 705/401 |
| 2004/0122776 A1 | 6/2004 | Sansone | |
| 2004/0122779 A1 | 6/2004 | Stickler et al. | |
| 2004/0128264 A1 | 7/2004 | Leung et al. | |
| 2004/0185827 A1 | 9/2004 | Parks | |
| 2004/0185882 A1 | 9/2004 | Gecht et al. | |
| 2004/0186811 A1* | 9/2004 | Gullo | G06Q 30/04 705/402 |
| 2004/0215581 A1 | 10/2004 | Lord et al. | |
| 2004/0215583 A1 | 10/2004 | Elliott | |
| 2004/0254808 A1 | 12/2004 | Bennett et al. | |
| 2005/0065892 A1 | 3/2005 | Ryan et al. | |
| 2005/0065896 A1 | 3/2005 | Kummer et al. | |
| 2005/0065897 A1 | 3/2005 | Ryan et al. | |
| 2005/0065898 A1* | 3/2005 | Elliot | B07C 3/00 705/404 |
| 2005/0080751 A1 | 4/2005 | Burningham | |
| 2005/0116047 A1 | 6/2005 | Lu et al. | |
| 2005/0119786 A1 | 6/2005 | Kadaba | |
| 2005/0137949 A1* | 6/2005 | Rittman | G06Q 20/227 705/35 |
| 2005/0171869 A1 | 8/2005 | Minnocci | |
| 2005/0192899 A1 | 9/2005 | Reardon | |
| 2005/0192911 A1 | 9/2005 | Mattem | |
| 2005/0192913 A1* | 9/2005 | Lubart | G06Q 10/08 705/406 |
| 2005/0209913 A1* | 9/2005 | Wied | G06Q 10/083 705/12 |
| 2005/0237203 A1 | 10/2005 | Burman et al. | |
| 2005/0278266 A1 | 12/2005 | Ogg et al. | |
| 2006/0000648 A1 | 1/2006 | Galtier | |
| 2006/0020505 A1 | 1/2006 | Whitehouse | |
| 2006/0122947 A1 | 6/2006 | Poulin | |
| 2006/0173796 A1 | 8/2006 | Kara | |
| 2006/0220298 A1 | 10/2006 | Fairweather et al. | |
| 2006/0238334 A1 | 10/2006 | Mangan et al. | |
| 2006/0259390 A1 | 11/2006 | Rosenberger | |
| 2006/0283943 A1 | 12/2006 | Ostrowski et al. | |
| 2007/0005376 A1* | 1/2007 | Ryan, Jr. | G06Q 10/08 705/39 |
| 2007/0033110 A1* | 2/2007 | Philipp | G06Q 10/02 705/5 |
| 2007/0073587 A1 | 3/2007 | Walker et al. | |
| 2007/0078795 A1 | 4/2007 | Chatte | |
| 2007/0080228 A1 | 4/2007 | Knowles et al. | |
| 2007/0174215 A1 | 7/2007 | Morel | |
| 2007/0253350 A1 | 11/2007 | Tung et al. | |
| 2007/0255664 A1 | 11/2007 | Blumberg et al. | |
| 2008/0046384 A1 | 2/2008 | Braun et al. | |
| 2009/0164392 A1 | 6/2009 | Raju et al. | |
| 2010/0298662 A1 | 11/2010 | Yu et al. | |
| 2010/0312627 A1 | 12/2010 | Khechef et al. | |
| 2011/0015935 A1 | 1/2011 | Montgomery et al. | |
| 2011/0022544 A1 | 1/2011 | Kim et al. | |
| 2011/0029429 A1 | 2/2011 | Whitehouse | |
| 2011/0071944 A1 | 3/2011 | Heiden et al. | |
| 2011/0145107 A1 | 6/2011 | Greco | |
| 2011/0225180 A1 | 9/2011 | Liao et al. | |
| 2012/0008766 A1 | 1/2012 | Robertson et al. | |
| 2012/0159603 A1 | 6/2012 | Queck | |
| 2012/0233252 A1 | 9/2012 | Vats et al. | |
| 2012/0240204 A1 | 9/2012 | Bhatnagar et al. | |

FOREIGN PATENT DOCUMENTS

| | | |
|---|---|---|
| DE | 4409386 A1 | 9/1995 |
| EP | 0137737 A2 | 4/1985 |
| EP | 153816 A2 | 9/1985 |
| EP | 0282359 A2 | 9/1988 |
| EP | 0507562 A2 | 10/1992 |
| EP | 0571259 A1 | 11/1993 |
| EP | 0596706 A1 | 5/1994 |
| EP | 0658861 A1 | 6/1995 |
| EP | 0927958 A2 | 7/1999 |
| EP | 0927963 A2 | 7/1999 |
| FR | 2580844 A1 | 10/1986 |
| GB | 2246929 A | 2/1992 |
| GB | 2251210 A | 7/1992 |
| GB | 2271452 A | 4/1994 |
| JP | 63147673 | 6/1988 |
| JP | 04284558 B2 | 10/1992 |
| JP | 05-132049 | 5/1993 |
| JP | 11-249205 | 9/1999 |
| JP | 2000-105845 A | 4/2000 |

(56) References Cited

FOREIGN PATENT DOCUMENTS

| WO | WO-88/01818 A1 | 3/1988 |
| WO | WO-9427258 A1 | 11/1994 |
| WO | WO-1995/19016 | 7/1995 |
| WO | WO-9714117 A2 | 4/1997 |
| WO | WO-9740472 | 10/1997 |
| WO | WO-98/14907 A2 | 4/1998 |
| WO | WO-98/14909 A2 | 4/1998 |
| WO | WO-98/57302 A1 | 12/1998 |
| WO | WO-98/57460 A1 | 12/1998 |
| WO | WO-99/48054 A1 | 9/1999 |
| WO | WO-02063517 A2 | 8/2002 |
| WO | WO 03/039051 A2 | 5/2003 |
| WO | WO-03/083784 | 10/2003 |

OTHER PUBLICATIONS

Anonymous, "Automated Indicia Detection System From Parascript Protects Postage Revenue for Postal Operators, Cracks Down on Fraud:—Parascript StampVerify Simplifies Complex Task of Automatically Locating and Verifying Different Types of Indicia on Envelope Images—," PR Newswire, New York, Sep. 18, 2007.
Davis Brad L.; "Printing System for Preventing Injustice by Delivering Print Data from Postal Charge Meter to Printer," Jan. 2001, 1 page.
Unpublished U.S. Appl. No. 12/103,496 to Bortnak et al, filed Apr. 15, 2008 and entitled "Systems and Methods for Activation of Postage Indicia at Point of Sale," 40 pages.
Unpublished U.S. Appl. No. 11/509,309 to Leon, filed Aug. 24, 2006 and entitled "Invisible Fluorescent Ink Mark," 15 pages.
Unpublished U.S. Appl. No. 12/030,739 to McBride et al., filed Feb. 13, 2008 and entitled "Systems and Methods for Distributed Activation of Postage," 35 pages.
Tygar, J.D.et al., "Cryptography: It's Not Just for Electronic Mail Anymore," School of Computer Science, Carnegie Mellon University, Pittsburg, PA, Mar. 1, 1993, 23 pages.
"Miniature, Coin-Shaped Chip is Read or Written with a Touch," News Release, Dallas Semiconductor, Jul. 1991, 9 pages.
International Search Report for PCT/US96/16366, dated Jun. 13, 1997, 9 pages.
Terrell, K, "Licking Stamps: A PC and a Printer Will End Trips to the Post Office," U.S. News & World Report, Sep. 28, 1998, vol. 125, No. 12, 4 pages.
Computergram International, "U.S. Postal Service to Introduce PC Postage Plans Today," Aug. 9, 1999, No. 3720, 1 page.
Stamps: Beyond Elvis, May 15, 1994, New York Times Archives, 2 pages.
Minnick, R. "Postage Imprinting Apparatus and Methods for Use With a Computer Printer," Apr. 27, 1995, 71 pages.
Office Action dated Mar. 13, 2007 for JP 515,253/97; with English language translation (4 pages).
English translation of German Office Action issued for DE 195 49 613.2 and German Office Action dated Nov. 20, 2007, 6 pages.
English translation of German Office Action issued for DE 195 49 613.2 and German Office Action dated Mar. 29, 2001, 10 pages.
U.S. Appl. No. 12/316,240, filed Dec. 9, 2008, Leon.
U.S. Appl. No. 12/553,824, filed Sep. 3, 2009, Bortnak et al.
U.S. Appl. No. 12/103,496, filed Apr. 15, 2008, Bortnak et al.
U.S. Appl. No. 12/030,739, filed Feb. 13, 2008, McBride et al.
U.S. Appl. No. 11/616,569, filed Dec. 27, 2006, Tsuie et al.
U.S. Appl. No. 11/729,148, filed Mar. 27, 2007, Stamps.com.
U.S. Appl. No. 11/616,546, filed Dec. 27, 2006, Bussell et al.
U.S. Appl. No. 11/509,309, filed Aug. 24, 2006, J.P. Leon.
Ford, Colleen, "Frequent Flyer Programs," Australian Accountant, 63,1, Feb. 1993, pp. 52-58.
Alexander, Keith L., "U.S. Stamps Pay Tribute to Starry-Eyed Jurors", Final Edition, Calgary Herald, Calgary, Alberta, Canada, Sep. 14, 2007, 2 pgs.
Office Action issued for U.S. Appl. No. 11/353,690 dated Aug. 3, 2009, 19 pgs.
"Domestic Mail Manual Section 604", Aug. 31, 2005.
"Mobile Postage stamps via text message announced", http://telecoms.cytalk.com/2011/03/mobile-postage-stamps-via-text-messages-announced/, CY.TALK Telecoms News Blog, Mar. 14, 2011 in Telecoms, Texting, pp. 1-9.
Mobile Postage Stamps Via Text Messages Announced, Phone Reviews, Mobile Phones, News, Mar. 11, 2011, pp. 1-3.
U.S. Appl. No. 09/491,949, filed Jan. 26, 2000, Salim G. Kara.
U.S. Appl. No. 10/862,058, filed Jun. 4, 2004, Pagel et al.
U.S. Appl. No. 11/353,690, filed Feb. 14, 2006, Kara.

\* cited by examiner

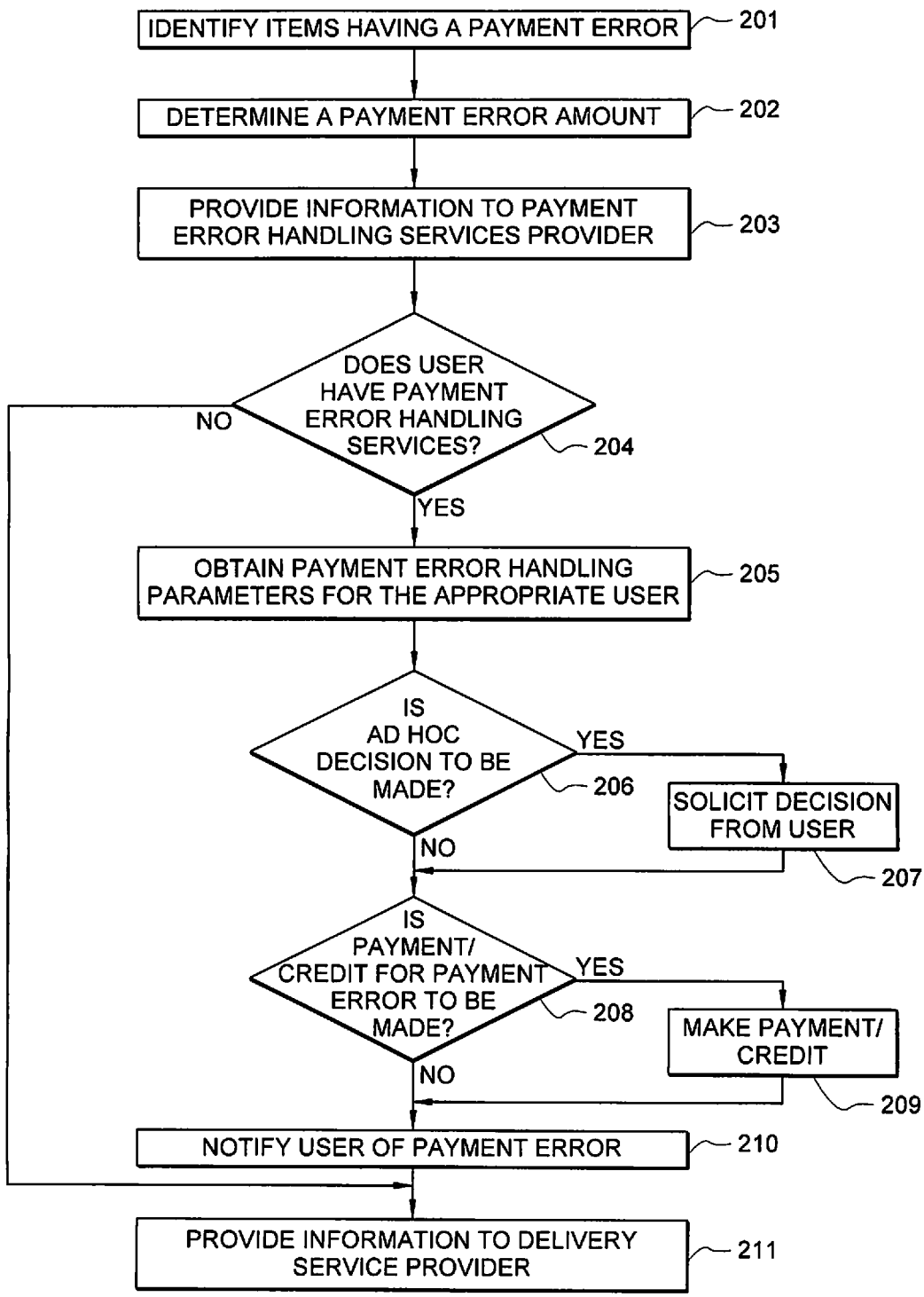

SYSTEM AND METHOD FOR HANDLING PAYMENT ERRORS WITH RESPECT TO DELIVERY SERVICES

CROSS-REFERENCE TO RELATED APPLICATIONS

The present application is a continuation of co-pending, commonly assigned, patent application Ser. No. 11/616,546 entitled "SYSTEM AND METHOD FOR HANDLING PAYMENT ERRORS WITH RESPECT TO DELIVERY SERVICES," filed Dec. 27, 2006 and is related to U.S. patent application Ser. No. 11/353,690 entitled "System and Method for Validating Postage," filed Feb. 14, 2006 and now U.S. Pat. No. 7,711,650 issued May 4, 2010, U.S. patent application Ser. No. 09/491,949 entitled "System and Method for Printing Multiple Postage Indicia," filed Jan. 26, 2000 and now U.S. Pat. No. 7,343,357 issued Mar. 11, 2008, and U.S. patent application Ser. No. 10/862,058 entitled "Virtual Security Device," filed Jun. 4, 2004, the disclosures of which are hereby incorporated herein by reference.

TECHNICAL FIELD

The present invention is directed generally to providing payment for postal and shipping services, and more particularly to handling payment errors with respect to postal and shipping services.

BACKGROUND OF THE INVENTION

Many postal and shipping services (referred to collectively herein as delivery services) require prepayment for such services, as may be shown through some form of value indicia placed on a letter or parcel. For example, postal services such as the United States Postal Service (USPS) require a stamp, meter stamp, or postage indicia to be affixed to letters and parcels upon their entry into the mail stream in order to show that a requisite amount of value has been paid for their handling and delivery.

Often, either through error or malfeasance, a user of a delivery service may purchase and thus apply an incorrect amount of postage to an item for which delivery services are desired. Such errors in postage typically result in a payment shortage. Allowing such payment shortages to pass unchecked can result in significant losses in revenues for a delivery service such as the USPS. Accordingly, delivery services often have some procedure in place, typically manual, for identifying and handling payment shortages.

The USPS, for example, has implemented a manual procedure for identifying and handling payment shortages. Although the processing of mail and parcels by the USPS is highly automated, payment shortages are primarily identified through manual intervention. For example, as a letter or parcel passes through the mail stream, a postal employee may notice that a container appears unusually large or excessively heavy for the amount of postage applied. This postal item will be physically removed from the mail stream and placed in a bin for providing to a payment shortage processing department for manual processing. The payment shortage processing department will typically weight, and possibly measure, the postal item to determine the correct amount of postage for the delivery services.

If it is determined that the amount of postage applied constitutes an underpayment, the payment shortage processing department may handle the mail in one of two ways. If the amount of underpayment is not excessive (e.g., less than one-half the proper amount) and the postal item is not part of a mailing from a same sender in which a large number (e.g., ten or more) of postal items have an improper postage amount affixed thereto, the postal item may be marked "postage due" and the requested delivery services performed. In such a situation, it falls upon the recipient to either pay the amount of the underpayment or to refuse delivery of the postal item, in which case the postal item will be returned to the sender where possible. If the amount of underpayment is excessive (e.g., more than one-half the proper amount), the postal item is part of a mailing from the same sender in which a large number (e.g., ten or more) of postal items have an improper postage amount affixed thereto, or there is another reason for refusing to deliver the postal item (e.g., the postal item involves international delivery), the postal item may be returned to the sender or delivery by the delivery service may otherwise be refused.

It can be appreciated from the foregoing that underpayment for delivery services can result in appreciable increased costs for a delivery service provider. For example, manual identification and processing of postal items results in significant per item costs over the typical automated processing provided by such delivery services as the USPS. Moreover, providing for the collection and accounting of postage due payments adds a significant burden to the delivery service's processes. Returning items to a sender incurs appreciable costs by the delivery service provider (perhaps as much as delivering the item to the intended recipient). Moreover, the foregoing processing results in delays in delivery of the item, thereby causing dissatisfaction with senders and receivers alike. However, such processing of payment shortages for delivery services is considered necessary by delivery services in order to discourage chronic or systematic underpayment, which would have significant revenue losses associated therewith.

BRIEF SUMMARY OF THE INVENTION

The present invention is directed to systems and methods which provide processing of payment errors (e.g., underpayments and/or overpayments) with respect to delivery services in accordance with user preferences. According to embodiments of the invention, a delivery service user (e.g., senders and/or recipients of letters or parcels) provides information with respect to how payment errors with respect to delivery services provided to the user are to be handled to facilitate electronic and/or automated processing of such payment errors. For example, a user may authorize payment shortages to be deducted from a postage meter balance associated with the user, may authorize payment of such shortages on the user's behalf for later billing to the user (e.g., monthly post-billing), may request notification of such payment shortage for an ad hoc determination by the user as to how the shortage is to be handled, may elect to have postal items returned to the user in the case of payment shortage. One or more of the foregoing user preferences with respect to handling payment errors may be based upon one or more criteria, such as payment shortages under a particular amount (e.g., payment is authorized for any payment shortage under $1.00), payment overages over a particular amount (e.g., crediting an account is authorized for any payment overage over $1.00), payment shortages totaling less than a particular number per period (e.g., payment is authorized for up to 10 payment shortages per month), payment shortages for particular delivery services (e.g., payment is authorized for first class mail delivery), payment shortages for particular recipients (e.g., payment is authorized for delivery to any address on a list of addresses provided by the user), etcetera.

According to an embodiment of the invention, a user for which processing of payment errors is provided is a user of an information based indicia (IBI) postage indicia system. For example, the user may have a postage account with Stamps.com, the assignee of the present application, for generating and printing postage indicia using a computer based system. Such IBI may be utilized for identifying the user, a postage account associated with the user, a meter number associated with the user, an amount of postage paid, a particular delivery service requested, the type of item to be delivered, any discounts or special pricing applicable to the requested delivery service, address information with respect to the user, address information with respect to the intended recipient, and/or the like. In operation according to an embodiment of the invention, an item bearing the foregoing IBI may be identified as having an error in the payment amount for the particular delivery service requested. The IBI may be scanned, or otherwise read to obtain various desired information. For example, user identification information (e.g., user name, user address, unique meter number, etcetera) and/or user account information (e.g., unique user account number, service provider providing the user metering services, etcetera) may be obtained for electronic processing of the payment error. Scanning of the IBI may take place upon initial acceptance of an item into the mail stream (e.g., acceptance by a postal clerk), during processing of the item for delivery (e.g., during sorting), or at any other time deemed appropriate according to an embodiment of the invention.

Embodiments of the invention operate to determine a user's preferences with respect to handling the payment error. For example, user identification information and/or user account information obtained from an IBI may be associated with a particular service provider, such as Stamps.com, providing payment error handling services for the user. An application programming interface (API), or any other appropriate interface (e.g., web application interface), may be used by the delivery service provider to interact with a payment error handling services provider and/or metering services provider in order to determine the user's preferences in handling the payment error, and perhaps to receive payment for the requested services in order to prevent delay or return of the item.

For example, where the user's preferences indicate payment for an underpayment should be provided, the metering services provider may cause an appropriate amount to be deducted from a metering account associated with the user. Similarly, where the user's preference indicate payment for an underpayment should be provided, the payment error handling services provider may advance an appropriate amount on behalf of the user, for later billing to the user. The foregoing may provided electronically such that the delivery service provider is provided indication of payment in real-time and thus delay in delivery of the item, as well as processing of the item by the delivery service provider, is minimized. Such payment may include generation of an indicia, such as a supplemental postage indicia, at the delivery service provider's location for application to the item to facilitate further processing of the item.

Where the user's preference is not to pay an underpayment, the metering services provider may notify the user of the underpayment to allow an ad hoc decision as to how to handle the underpayment, which may result in more rapid payment for an appreciable number of items. Additionally or alternatively, where the user's preference is not to pay an underpayment, the metering services provider may notify the delivery service provider to return the item to the user, may request that the delivery service provider deliver the item postage due where possible, etcetera.

Handling of payment errors need not involve a metering services provider according to embodiments of the invention. For example, although a metering services provider may be a preferred provider for such payment error handling services where underpayments are to be funded using a user's metering account, payment services may be provided according to embodiments of the invention by other service providers, particularly where payment advances and post-billing is used. Moreover, payment error handling service providers may additionally or alternatively interface with one or more metering services providers in order to facilitate debiting a users metering account, where desired. Similarly, a metering services provider may provide payment error handling services with respect to users of another metering services provider, if desired.

The foregoing payment services may be provided to users with a surcharge. For example, in order to avoid delays in delivery of items, possibly including return of the item to the sender and repackaging of the item for a subsequent delivery attempt, users may agree to a fee per item or per service period in order to take advantage of the benefits of embodiments of the present invention.

Various levels of payment error handling services may be provided with respect to users. For example, users agreeing to the aforementioned surcharge may be provided a full complement of payment error handling services, including payment of underpayment amounts in order to avoid delays in delivering items. Whereas, other users may be provided only more basic services, such as providing notification that a payment error has been detected, notification that an item is being returned for a payment error, and/or the like.

Embodiments of the invention provide advantages in addition to the aforementioned minimizing delays in delivering and time for processing items having a payment error associated therewith. For example, detailed information, such as statistics with respect to users' payment errors, the numbers and types of payment errors, user's preferences in handling payment errors, etcetera, may be provided to delivery service providers and/or users according to embodiments of the invention. Using such information, a delivery service provider may deny further services to a user who chronically under pays for delivery services, for example.

It should be appreciated that payment error handling services provided according to embodiments of the invention may not only address underpayment, but may additionally or alternatively address overpayment. For example, although overpayment errors today typically result in the user forfeiting the overpayment amount, efficiencies of operation according to embodiments of the invention with respect to handling underpayment errors may facilitate a quid pro quo wherein amounts of overpayment errors, or some portion thereof, are refunded to a user (e.g., through credit to a meter account, through offsetting a post-payment amount, etcetera).

Payment error handling services may be provided not only with respect to a sender of an item, but such services may additionally or alternatively be provided with respect to a recipient of an item. For example, a recipient may establish preferences with respect to situations in which the recipient would like to authorize payment for an underpayment for delivery of an item to the recipient. Such payment might be debited from the recipient's meter account balance, be billed to the recipient, etcetera. In such an embodiment, the recipient may facilitate delivery of items without delay due to payment errors even where a sender of the item has not elected to participate in a payment error handling service.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 2 shows an exemplary flow diagram of operation of the payment error handling services system of FIG. 1.

DETAILED DESCRIPTION OF THE INVENTION

Figure 1:
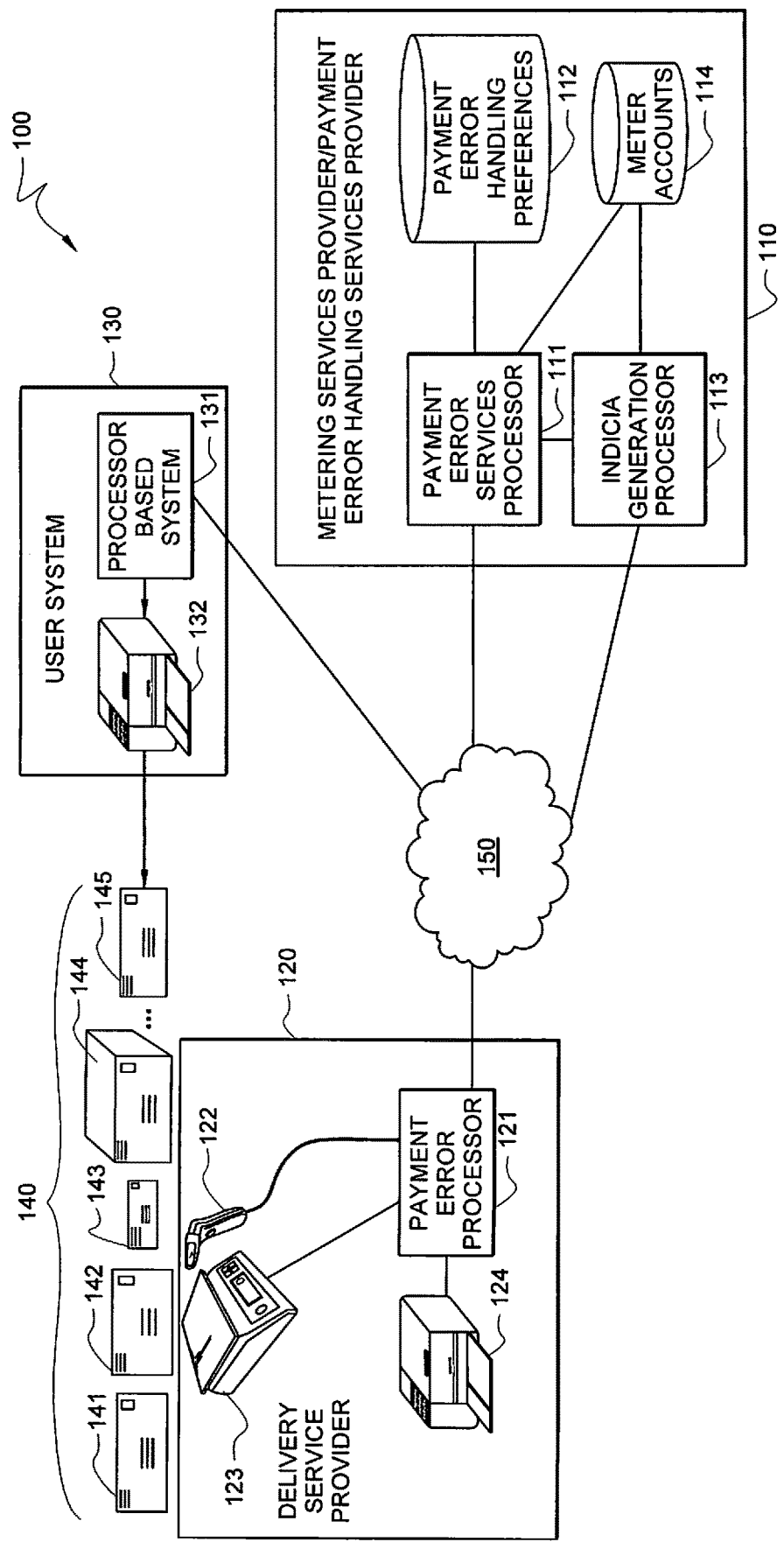
FIG. 1 shows a system adapted to provide payment error handling services according to an embodiment of the invention.

Directing attention to FIG. 1, system 100 adapted to provide handling of payment errors for delivery services according to an embodiment of the present invention is shown. In the illustrated embodiment, user system 130 provides for generation of delivery service indicia, such as may comprise an information based indicia used by the United States Postal Service (USPS) for delivery of mail and parcels. For example, processor-based system 131, such as may comprise a personal computer or other suitable processing platform, is used by a user to generate a delivery service indicia. The delivery service indicia, perhaps in combination with a shipping label or document forming all or part of an item to be delivered, may be printed by printer 132, such as may comprise a laser printer, an ink jet printer, etcetera. Processor-based system 131 may operate independently or in combination with other systems to generate and print the foregoing indicia. For example, processor-based system 131 may communicate via network 150, such as may comprise a local are network (LAN), metropolitan area network (MAN), wide area network (WAN), public switched telephone network (PSTN), an extranet, an intranet, the Internet, and/or the like, to communicate with an indicia generation platform, such as indicia generation processor 113. Details with respect to systems providing generation and printing of indicia for use in authorizing delivery of items is provided in the above referenced patent applications entitled "System and Method for Validating Postage," "System and Method for Printing Multiple Postage Indicia," and "Virtual Security Device."

In the illustrated embodiment, an item bearing the indicia is introduced into mail stream 140. Mail stream 140, shown as comprised of items 141-145, may include items introduced into the mail stream by a variety of different senders and may be bound for any number of different intended recipients. The foregoing items may be of various types, items of different sizes, items of different weights, items for which various services are to be provided, etcetera. Accordingly, various amounts for delivery services may be associated with ones of items 141-145. For example, parcel 144 may incur a delivery service charge which is higher than that associated with flat 142 which is higher than that associated with letter 141. Such delivery service charges may be affected by any or all of the weight of the item, the size of the item, the particular delivery service requested, the location of the sender, the location of the recipient, the contents of the item, the number of items introduced into the mail stream by the sender, etcetera. Accordingly, a user may easily provide an erroneous amount with respect to a delivery service indicia for any particular item. Therefore, the delivery service provider of the illustrated embodiment implements a process for identifying and handling payment errors.

Directing attention to FIG. 2, an exemplary process for identifying and handling payment errors with respect to delivery services through operation of system 100 of FIG. 1 is shown. At block 201 of the exemplary process, the delivery service provider determines that a payment error has been made with respect to a particular item. For example, flat 142 may be determined to have an insufficient amount of postage affixed thereto. Processing items to determine if an error in payment has been made may occur at various points in the handling of the item. For example, such processing may take place upon initial acceptance of an item into the mail stream (e.g., acceptance by a postal clerk), during processing of the item for delivery (e.g., during sorting), and/or other points in the handling of the item.

A determination that a payment error has been made may be made in a number of ways according to embodiments of the present invention. For example, mail stream 140 may pass through automated mail handling equipment of delivery service provider system 120 in which scale 123 and scanner 122 are disposed. Scanner 122 may comprise an optical scanner adapted to obtain an image of human readable information and convert that information to a form for processing by a processor-based system (e.g., optical character recognition functionality) and/or adapted to more directly read data (e.g., barcode reader, magnetic ink code reader, radio frequency identification reader, etcetera). Thus, scanner 122 may read a value represented by an indicia affixed to flat 142, a type of delivery service requested, information with respect to a location of the sender and/or intended recipient of flat 142, information with respect to the contents of flat 142, etcetera. Correspondingly, scale 123 may determine a weight of flat 142. Information with respect to an item's size may additionally or alternatively be collected. For example, scanner 122 may provide optical processing in order to determine a length, width, and/or height of flat 142. Any or all of the foregoing information may be provided to a processor-based system, such as payment error processor 121, for analysis to determine if a payment error has been made.

Payment error processor 121 of embodiments may comprise a computer system (e.g., an Intel PENTIUM based computer platform) operating under control of an instruction set setting forth operation as described herein. Payment error processor 121 of preferred embodiments analyzes information with respect to an item to determine if a payment error has been made. For example, information with respect to a type of delivery service requested, the weight of item 142, and the size of item 142 may be used to calculate an appropriate amount of payment. This calculated appropriate amount of payment may be compared to the value represented by the indicia affixed to flat 142 to determine if a payment error has occurred.

Although the foregoing embodiment has been described with reference to automated mail handling equipment, it should be appreciated that the concepts of the present invention may be applied to more traditional underpayment detection techniques. For example, flat 142 may be manually separated from mail stream 140 by an employee of the delivery service provider as putatively having a payment error. Flat 142 may later be placed on scale 123 and an indicia thereon scanned using scanner 122 by underpayment processing personnel. Relevant information with respect to flat 142, as discussed above, may be provided to payment error processor 121 for a determination as to whether a payment error has been made.

At block 202 of the illustrated embodiment, a payment error amount is determined. For example, payment error processor 121 may subtract the value represented by the indicia affixed to flat 142 from the calculated appropriate amount of payment to determine a payment error amount.

Although not shown in the illustrated embodiment, a determination may be made with respect to whether the payment error amount is sufficiently large (e.g., meets one or more predetermined threshold value) to warrant further payment error handling processing. For example, if an underpayment is less than a first threshold amount (e.g., $0.01) it may be decided that further payment error handling is undesirable. Similarly, if an overpayment is less than a second threshold amount (e.g., $0.25) it may be decided that further payment error handling is undesirable. According to embodiments of the invention, the foregoing threshold values may be the same, the first threshold may be greater than the second threshold, different threshold amounts may be used with respect to different users, types of services, types of items, etcetera. Moreover, thresholds used for such determinations may not be a predetermined amount, but rather a percentage of an amount (e.g., percentage of the indicia value, percentage of the proper value, or percentage of the payment error). Preferred embodiments of the invention, however, proceed to process all underpayments using the efficiencies of electronic processing as described herein to make such processing practicable.

Information with respect to the payment error is provided to a payment error handling service provider at block 203 of the illustrated embodiment. For example, payment error processor 121 provides information to identify a user or user account and the payment error amount to payment error services processor 111 of metering services provider/payment error handling service provider system 110 via network 150 according to an embodiment of the invention.

Payment error services processor 111 of embodiments may comprise a computer system (e.g., an Intel PENTIUM based computer platform) operating under control of an instruction set setting forth operation as described herein. Payment error services processor 111 of preferred embodiments processes payment error information with respect to an item to determine how the payment error is to be handled and to provide information to payment error processor 121 to facilitate handling of the payment error and associated item by the delivery service provider.

At block 204 a determination is made as to whether a user associated with the item having a payment error has payment error handling services and/or what level of payment error handling services are to be provided. For example, a user of an Internet postage service, such as that available from Stamps.com, may elect to be provided payment error handling services. Accordingly, information provided by payment error processor 121 may be used to identify a user and/or an account and to determine if that user or account has payment error handling services associated therewith. According to embodiments of the invention, database 112 may store information with respect to particular users, accounts, meter numbers, etcetera for which payment error handling services are/are not to be provided. Moreover, the information in database 112 may include a level of payment error handling services to be/not to be provided with respect to such users, accounts, meter numbers, etcetera.

If it is determined at block 204 that payment error handling services are not to be provided, processing according to the illustrated embodiment proceeds to block 211 wherein information is provided to the delivery service provider that payment error handling services are not being provided. For example, payment error services processor 111 may provide data to payment error processor 121 that no payment error handling with respect to the particular item is being provided by the payment error handling services provider and that the delivery service provider should handle the item according to an alternate process (e.g., deliver postage due or return to sender).

Embodiments of the present invention operate to provide a minimum level of payment error handling services even where a user has not elected to receive such services. For example, in addition to providing information to delivery service provider at block 211, embodiments of the invention provide notification to a user of the payment error (block 210) if it is determined at block 204 that payment error handling services are not to be provided.

If, however, it is determined at block 204 that payment error handling services are to be provided, processing according to the illustrated embodiment proceeds to block 205 wherein payment error handling parameters for the appropriate user, account, meter number, etcetera are obtained. For example, database 112 may store information with respect to how payment errors associated with particular users, accounts, meter numbers, etcetera are to be handled. A user may interact with processor-based system 131 to establish desired payment error handling parameters for use by payment error services processor 111, such as through interaction with indicia generation processor 113 and/or payment error services processor 111 to cause appropriate information to be stored in database 112.

Such information may include whether payment for an underpayment is authorized, whether credit for an overpayment is authorized, a maximum amount of payment for an underpayment which is authorized, a maximum number of payments per period for underpayment that are authorized, a total amount of payments per period for underpayment that is authorized, the types of delivery services for which payment for underpayment is authorized, the intended recipients for which payment for underpayment is authorized, the types of items for which payment for underpayment is authorized, etcetera. The information stored in database 112 may additionally or alternatively include whether payment for underpayment or credit for overpayment is to be debited/credited to a particular prepaid account or is to be advanced for post-billing to the user and whether the user is to decide ad hoc (for some or all payment error handling services) how a payment error is to be handled. Such parameters may be utilized by a user to, for example, control a delivery services budget, to avoid depleting an account unexpectedly, or to facilitate completion of particular delivery services without delay while allowing less important delivery services to be handled in a more traditional manner.

At block 206 a determination is made as to whether the user is to make an ad hoc decision with respect to handling the payment error. For example, information with respect to the amount of the payment error, the type of delivery service requested, the intended recipient, the contents of the item, etcetera may be utilized with respect to the foregoing parameters stored in database 112 to determine that the user wishes to make an ad hoc decision for handing the payment error.

If it is determined at block 206 that the user is to make an ad hoc decision for handling the payment error, processing according to the illustrated embodiment proceeds to block 207 wherein a decision is solicited from the user. For example, one or more messages, such as an electronic mail communication, a short message service (SMS) message, an instant message (IM), an interactive voice response (IVR) message, and/or the like, may be directed to the user in an effort to solicit a decision. Preferably, a user is given some limited amount of time (e.g., 24 hours) for a decision before a default payment error handling process is implemented. Accordingly, embodiments of the invention operate to utilize real-time messaging where available. Various information with respect to the item for which a payment error has been made, such as the amount of the payment error, the type of delivery service requested, the intended recipient, the contents of the item, etcetera, may be provided to the user in order to facilitate the ad hoc decision.

A user may, for example, decide that a meter account associated with the user is to be debited for an underpayment, that the payment error handling services provider should advance an underpayment amount and post-bill the user, that no payment of an underpayment is to be made and thus the delivery service provider is to handle the payment error by another process, that an overpayment amount is to be credited to a meter account associated with the user, etcetera. Information indicating the user's ad hoc decision with respect to handing the payment error is preferably provided to payment error services processor 111, such as via an electronic mail communication, a SMS message, an IM, an IVR response, and/or the like. For example, a user may interact with processor-based system 131 to provide information with respect to a payment error handling decision to payment error services processor 111 via network 150.

If, however, it is determined at block 206 that the user is not to make an ad hoc decision for handling the payment error, or after solicitation of an ad hoc decision from the user at block 207, processing according to the illustrated embodiment proceeds to block 208 wherein it is determined as to whether a payment/credit for the payment error is to be made. For example, as mentioned above a user may decide ad hoc that an underpayment is to be paid, whether by debiting an account associated with the user or by advancing payment, by the payment error handling services provider. Similarly, the user's payment error handling preferences, as stored in database 112, may indicate for the circumstances associated with this particular item that an underpayment is to paid by the payment error handling services provider.

Accordingly, if it is determined that a payment/credit for the payment error is to be made at block 208, processing according to the illustrated embodiment proceeds to block 209 wherein the payment/credit is made.

If, however, it is determined at block 208 that a payment/credit for the payment error is not to be made at block 208, processing according to the illustrated embodiment proceeds to block 210 wherein the user is notified of the payment error. For example, as mentioned above a user may decide ad hoc that an underpayment is to be handled by means other than payment facilitated through the payment error handling services provider. Similarly, the user's payment error handling preferences, as stored in database 112, may indicate for the circumstances associated with this particular item that an underpayment is to be handled by means other than payment facilitated through the payment error handling services provider. Accordingly, a payment/credit may not be made in response to there being a payment error.

Notification of the payment error and/or how the payment error is being handled is provided to a user at block 210 of the illustrated embodiment. For example, an electronic mail communication, a SMS message, an IM, an IVR message, and/or the like may be provided to the user to provide information with respect to the payment error and how that payment error is being handled by the payment error handling services provider and/or delivery service provider.

At block 211 of the illustrated embodiment, information for facilitating the delivery service provider handling the payment error in accordance with the user's preferences is provided to the delivery service provider. For example, payment error services processor 111 may provide information representing a value transfer in the amount of an underpayment to payment error processor 121 via network 150 on behalf of the user in order to facilitate delivery of flat 142 without further delay. Alternatively, payment error services processor 111 may provide information instructing payment error processor 121 to process flat 142 according to a default payment error handling process via network 150 where the user prefers not to have the payment error handling services provider make payment on behalf of the user.

According to embodiments of the invention, payment error services processor interacts with indicia generation processor 113 to cause a supplemental value indicia, in an amount of an underpayment for delivery services, to be generated and transmitted to payment error processor 121. Payment error processor 121 may cause the supplemental value indicia to be applied to flat 142, such as by printing the indicia at printer 124. Accordingly, further processing of flat 142 by the delivery service provider may be without additional delay due to the previous payment error.

Additionally or alternatively, payment error processor 121 may provide information to other systems of the delivery service provider in order to avoid subsequent processing of item 142 due to the previously identified payment error.

Although not shown in the exemplary process of FIG. 2, embodiments of the invention may operate to compile statistical information with respect to payment errors. For example, information with respect to users' payment errors, the numbers and types of payment errors, user's preferences in handling payment errors, etcetera, may be compiled for providing to delivery service providers and/or users according to embodiments of the invention. A delivery service provider may use such information to deny further services to a user who chronically under pays for delivery services, until such user has taken steps to address the situation.

Although the embodiment illustrated in FIG. 1 shows a same service provider providing both metering services and payment error handling services, it should be appreciated that such services may be separately provided according to embodiments of the invention. For example, a payment error services provider may provide payment error services with respect to payment errors associated with users of various different metering services, whether or not the payment error services provider itself also provide metering services.

Payment error handling services may be provided not only with respect to a sender of an item, but such services may additionally or alternatively be provided with respect to a recipient of an item. For example, steps of the process of FIG. 2 may be performed with respect to a sender to determine if payment error handling services are to be provided with respect to a sender of the item. If such services are not to be provided with respect to the sender, steps of the process may be performed with respect to an intended recipient to determine if payment error handling services are to be provided with respect to a recipient of the item. Similar to a sender, a recipient may establish preferences with respect to situations in which the recipient would like to authorize payment for an underpayment for delivery of an item to the recipient. Such payment might be debited from the recipient's meter account balance, be billed to the recipient, etcetera. In such an embodiment, the recipient may facilitate delivery of items without delay due to payment errors even where a sender of the item has not elected to participate in a payment error handling service.

A service surcharge may be assessed by a payment error handling services provider providing payment error handling services according to embodiments of the invention. For example, in addition to the amount of an underpayment, the payment error handling services provider may collect an additional amount (e.g., a predetermined amount, an amount based upon the type of delivery service, an amount based upon the charges for the delivery service, an amount based upon a level of payment error handling services provided, etcetera) from users for the payment error handling service. According to embodiments of the invention, such surcharges may be deducted from a meter account along with an underpayment amount. Similarly, such surcharges may be deducted from a credit to be made to a meter account in association with an overpayment. Of course, various techniques for collecting such surcharges may be implemented, such as prepayment, post-payment, billing separate from debiting/crediting amounts to a metering account, etcetera.

It should be appreciated that, although embodiments have been described herein with reference to handling payment errors, embodiments of the present invention may be utilized to provide for handling payment for services which are not associated with a payment error. For example, the systems and methods described herein may be utilized to facilitate a postage metering process which deducts or otherwise commits postage value only with respect to postal items actually processed by the postal authority. Accordingly, refunds for misprinted postage indicia may be avoided. Likewise, postage indicia which is generated, but never used, does not result in forfeiture of postage value according to embodiments of the invention.

In operation according to an embodiment of the invention, a non-funded or partially funded postage indicium (referred to herein as a "unfunded postage indicium") is generated by a user. This unfunded funded postage indicium preferably appears to be a typical postage indicium (such as the aforementioned IBI), but the full value of postage value for payment of delivery services has not been committed (e.g., a meter descending register has not been decremented in the full amount of postage to be used for delivery of an item) at generation of the unfunded postage indicium. The unfunded postage indicium preferably includes information identifying a user, a meter, an account, etcetera for identifying an appropriate user or account from which payment for postage is to be obtained, as described above. Thereafter, when the item associated with the unfunded postage indicium is handled, the unfunded postage indicium may be scanned or otherwise read, such as by scanner 122, a payment processor, such as that of payment error processor 121 described above, may operate to provide for payment, or full payment, for the postage.

The foregoing embodiment, providing for payment of postage when an associated item is handled, ensures that only postage for items which are actually handled for delivery is paid by a user. Accordingly, if a unfunded postage indicium fails to print properly or otherwise remains unused, the user need not take any steps for obtaining a refund. Moreover, users may pay only for postage actually needed, at the time of use, rather than pre-paying for an amount of postage which is expected to be used in the future, as is the case with typical postage metering paradigms.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing payment error handling services comprising:

maintaining, at one or more databases hosted by a metering service provider, user profiles associated with users of a processor-based system of said metering service provider, said processor-based system of said metering service provider configured to generate postage indicia data for mail items and to provide said postage indicia data to one or more remote user computing systems for printing postage indicia, wherein each of the user profiles comprises information regarding a payment error designated payment account of a particular user, and wherein said payment error designated payment account of said particular user is a payment account that said metering service provider is authorized to access when correcting payment errors for mail items sent by said particular user;

receiving, by said processor-based system of said metering service provider, payment error correction information from a user via a network, wherein said payment error correction information is different from information regarding a payment error designated payment account of said user, and wherein said payment error correction information specifies one or more parameters that configure said processor-based system of said metering service provider to determine when said metering service provider is and is not authorized to correct payment errors on behalf of said user such that delivery delays for mail items having payment errors are mitigated via payment error correction processing using said payment error correction information;

storing, at said one or more databases, said payment error correction information in association with a user profile associated with said user;

extracting, by a scanner of an automated mail processing system of a delivery service provider, data from mail items placed within a mail stream of said delivery service provider;

weighing, by a scale of said automated mail processing system, said mail items placed within the mail stream;

detecting, by a processor-based system of said delivery service provider, a payment error with respect to a mail item placed within said mail stream, based at least in part on a weight of that mail item, determined by the weighing, wherein said processor-based system of said delivery service provider is configured to detect payment errors with respect to mail items placed within said mail stream based on the weighing, the extracting, or both the weighing and the extracting;

receiving notice, by said processor-based system of said metering service provider from said delivery service provider via the network, that said mail item that has said payment error has been placed in said mail stream provided by said delivery service provider, wherein said metering service provider is a different provider than said delivery service provider;

evaluating, by said processor-based system of said metering service provider, said payment error against one or more payment error correction processing thresholds to determine whether to perform or forego performing payment error correction processing operations; and in response to a determination, based on said evaluating, to perform said payment error correction processing operations, performing, by said processor-based system of said metering service provider, said payment error correction processing operations, said payment error correction processing operations comprising:

accessing, by said processor-based system of said metering service provider, said one or more databases to obtain said user profile and said payment error correction information of said user associated with said mail item based on said notice, wherein said user corresponds to a sender of the mail item or a recipient of the mail item;

identifying, by said processor-based system of said metering service provider, payment error correction data comprising information associated with: a number of previous payment errors corrected within a period of time, and a total value of previous payment errors corrected within a period of time;

determining, by said processor-based system of said metering service provider, whether said metering service provider is authorized to automatically correct said payment error based on whether said payment error correction data satisfies at least one of the one or more parameters specified by said payment error correction information, wherein said processor-based system of said metering service provider is configured to automatically correct said payment error using the payment error designated payment account of said user when said automatic payment error correction is authorized and to not automatically correct said payment error when said automatic payment error correction is not authorized, wherein a determination that said metering service provider is authorized to automatically correct said payment error is based on at least one of whether said number of previous payment errors corrected within said period of time is less than a threshold number of payment errors and whether said total value of said previous payment errors corrected within the period of time is less than a threshold value;

automatically correcting, by said processor-based system of said metering service provider, said payment error using said payment error designated payment account of said user when said automatic payment error correction is authorized; and transmitting, by said processor-based system of said metering service provider, a payment error correction notification comprising information associated with a result of said payment error correction to said delivery service provider, wherein said delivery service provider delivers said mail item when said notification indicates said payment error has been corrected.

2. The method of claim 1 further comprising:
requesting, by said processor-based system of said metering service provider, said user to designate said payment error designated payment account.

3. The method of claim 1 wherein said payment error correction information comprises threshold values below which said metering service provider is authorized by said sender to correct said payment error.

4. The method of claim 1 wherein said payment error correction information comprises threshold values above which said metering service provider is not authorized by said sender to correct said payment error.

5. The method of claim 1 wherein determining, by said processor-based system of said metering service provider, whether said payment error correction is authorized based on said recipient of the mail item includes determining whether said payment error correction information identifies said recipient of said mail item as a recipient for which said processor-based system of said metering service provider is authorized to correct said payment error.

6. The method of claim 1 wherein said payment error designated payment account of said user is a different account as compared to an account used by said processor-based system of said metering service provider to generate a postage indicium for said mail item.

7. The method of claim 1 wherein said payment error designated payment account is a post-billing account.

8. The method of claim 1, further comprising:
performing said payment error correction utilizing ad hoc instructions based on said payment error correction information and said payment error correction data when said automatic payment error correction is authorized, wherein performing said payment error correction based on said ad hoc instructions comprises:
transmitting, by said processor-based system of said metering service provider, an ad-hoc-related notification to said user, wherein said ad-hoc-related notification instructs said user to provide said ad hoc instructions regarding said payment error correction authorization; and
receiving, by said processor-based system of said metering service provider, a response to said ad-hocrelated notification comprising said ad hoc instructions, wherein said payment error correction is handled in accordance with said ad hoc instructions provided in the response.

9. A system for providing payment error handling services comprising:
- a scanner of an automated mail processing system of a delivery service provider, said scanner configured to extract data from mail items placed within a mail stream of said delivery service provider;
- a scale of said automated mail processing system weighing said mail items placed within the mail stream;
- a processor-based system of said delivery service provider configured to detect a payment error with respect to a mail item placed within said mail stream, based at least in part on a weight of the mail item determined by the weighing, wherein said processor-based system of said delivery service provider is configured to detect payment errors with respect to mail items placed within said mail stream based on the weighing, the extracting, or both the weighing and the extracting;
- one or more databases, hosted by a metering service provider, configured to maintain user profiles associated with users of a processor-based system of said metering service provider, wherein each of the user profiles comprises information regarding a payment error designated payment account of a particular user, and wherein said payment error designated payment account of said particular user is a payment account that said metering service provider is authorized to access when correcting payment errors for mail items sent by said particular user; and
- one or more processors, hosted by said metering service provider, configured to:
  - receive payment error correction information from a user, wherein said payment error correction information is different from said information regarding a payment error designated payment account of said user, and wherein said payment error correction information specifies one or more parameters that configure said one or more processors to determine when said metering service provider is and is not authorized to correct payment errors on behalf of said user such that delivery delays for mail items having payment errors are mitigated via payment error correction processing using said payment error correction information;
  - store said information regarding said payment error designated payment account of said user and said payment error correction information of said user in association with a user profile of said user;
  - receive notice, from said delivery service provider via a network, that said mail item that has said payment error has been placed in a mail stream operated by said delivery service provider, wherein said metering service provider is a different provider than said delivery service provider; and
  - perform payment error correction operations in response to receiving said notice, said payment error correction operations comprising:
    - access said one or more databases to obtain said user profile and said payment error correction information of said user based on said notice;
    - identify payment error correction data comprising a number of previous payment errors corrected for said user within a period of time, and a total value of previous payment errors corrected for said user within a period of time, wherein said user is a sender of said mail item or a recipient of said mail item;
    - determine whether said metering service provider is authorized to automatically correct said payment error based on whether said payment error correction data satisfies at least one of the one or more parameters specified by said payment error correction information, wherein said one or more processors are configured to automatically correct said payment error using a payment error designated payment account of said user when said automatic payment error correction is authorized and to not automatically correct said payment error when said automatic payment error correction is not authorized;
    - automatically correct said payment error using said payment error designated payment account of said user when said automatic payment error correction is authorized; and
    - transmit a payment error correction notification comprising information associated with a result of said payment error correction to said delivery service provider, wherein said delivery service provider delivers said mail item when said notification indicates said payment error has been corrected.

10. The system of claim 9 wherein said one or more processors are further configured to request said user to designate said payment error designated payment account.

11. The system of claim 9 wherein said payment error correction information comprises threshold values below which said metering service provider is authorized by said user to correct said payment error.

12. The system of claim 9 wherein said payment error correction information comprises threshold values above which said metering service provider is not authorized by said user to correct said payment error.

13. The system of claim 9 wherein said one or more processors are configured to determine whether said payment error correction is authorized based on said recipient of the mail item by determining whether said payment error correction information identifies said recipient of the mail item as a recipient for which said metering service provider is authorized to correct said payment error.

14. The system of claim 9 wherein said payment error designated payment account of said user is a different account as compared to an account used to generate a postage indicium for said mail item.

15. The system of claim 9 wherein said payment error designated payment account is a post-billing account.

16. The system of claim 9, wherein the one or more processors are configured to:
- perform said payment error correction utilizing ad hoc instructions based on said payment error correction information and said payment error correction data when said automatic payment error correction is authorized, wherein performing said payment error correction based on said ad hoc instructions comprises:
  - transmitting, by said one or more processors, an ad-hoc-related notification to said user, wherein said ad-hoc-related notification instructs said user to provide said ad hoc instructions regarding said payment error correction authorization; and
  - receiving, by said one or more processors, a response to said ad-hoc-related notification comprising said ad hoc instructions, wherein said payment error correction is handled in accordance with said ad hoc instructions provided in the response.

17. A method comprising:

maintaining user profiles associated with users of a processor-based system of a metering service provider at one or more databases, wherein each of the user profiles comprises information regarding a payment error designated payment account of a particular user, wherein said payment error designated payment account of said particular user is a payment account that said metering service provider is authorized to access when correcting payment errors for mail items placed into a mail stream of a delivery service provider by said particular user;

receiving notice, by said processor-based system of said metering service provider, from a processor-based system of said delivery service provider via a network, that a mail item that has a payment error has been placed in said mail stream of said delivery service provider, wherein said metering service provider is a different provider than said delivery service provider, and wherein said notice is received from said processor-based system of said delivery service provider in real-time in response to detection of said payment error of said mail item by mail processing infrastructure of said mail stream, wherein the detection of said payment error of said mail item is based at least in part on a weight of the mail item measured by a scale of an automated mail processing system of said delivery service provider, after said mail item has been placed within said mail stream of said delivery service provider, and wherein said processor-based system of said delivery service provider is configured to detect payment errors with respect to mail items placed within said mail stream based on the weighing, extracting data from mail items placed within said mail stream of said delivery service provider by a scanner of said automated mail processing system, or both the weighing and the extracting;

evaluating, by said processor-based system of said metering service provider, said payment error against one or more payment error correction processing thresholds to determine whether to perform or forego performing payment error correction processing operations; and in response to a determination, based on said evaluating, to perform said payment error correction processing operations, performing, by said processor-based system of said metering service provider, said payment error correction processing operations, wherein said payment error correction processing operations comprise:

accessing, by said processor-based system of said metering service provider, said one or more databases to obtain a user profile and payment error correction information of a user associated with said mail item based on said notice, wherein said user corresponds to a sender of the mail item or a recipient of the mail item;

identifying, by said processor-based system of said metering service provider, payment error correction data comprising information associated with: a number of previous payment errors corrected within a period of time, and a total value of previous payment errors corrected within a period of time;

determining, by said processor-based system of said metering service provider, whether said metering service provider is authorized to automatically correct said payment error based on whether said payment error correction data satisfies at least one of one or more parameters specified by said payment error correction information, wherein said processor-based system of said metering service provider is configured to automatically correct said payment error using a payment error designated payment account of said user when said automatic payment error correction is authorized and to not automatically correct said payment error when said automatic payment error correction is not authorized, wherein a determination that said metering service provider is authorized to automatically correct said payment error is based on at least one of whether said number of previous payment errors corrected within said period of time is less than a threshold number of payment errors and whether said total value of said previous payment errors corrected within the period of time is less than a threshold value;

automatically correcting, by said processor-based system of said metering service provider, said payment error using said payment error designated payment account of said user when said automatic payment error correction is authorized; and transmitting, by said processor-based system of said metering service provider, a payment error correction notification comprising information associated with a result of said payment error correction to said delivery service provider, wherein said delivery service provider delivers said mail item via said mail stream when said notification indicates said payment error has been corrected.

* * * * *